United States Patent [19]
Girard

[11] Patent Number: 4,812,840
[45] Date of Patent: Mar. 14, 1989

[54] MULTIPLE MODE SWITCHING MEANS

[75] Inventor: Donald J. Girard, Cambridge, Ohio

[73] Assignee: NCR Corporation, Dayton, Ohio

[21] Appl. No.: 67,563

[22] Filed: Jun. 29, 1987

[51] Int. Cl.$^4$ .............................................. H04Q 1/00
[52] U.S. Cl. ............................. 340/825.5; 340/825.51;
379/161
[58] Field of Search ................... 307/112, 115; 379/93,
379/94, 161, 165; 178/3, 17.5; 340/825.5,
825.51

[56] References Cited

U.S. PATENT DOCUMENTS

| | | | |
|---|---|---|---|
| 3,524,935 | 8/1970 | Gonsewski et al. | 179/81 |
| 3,644,896 | 2/1972 | Chaddha | 340/172.5 |
| 3,879,579 | 4/1975 | Fretwell | 179/2 DP |
| 4,013,956 | 3/1977 | Dornaus et al. | 325/22 |
| 4,076,961 | 2/1978 | Holsinger et al. | 179/2 DP |
| 4,254,307 | 3/1981 | Plunkett | 340/825.5 X |
| 4,291,200 | 9/1981 | Smith | 179/18 BD |
| 4,314,164 | 2/1982 | Tin et al. | 340/825.5 X |
| 4,367,374 | 1/1983 | Serrano | 179/2 C |
| 4,379,294 | 4/1983 | Sutherland et al. | 178/3 X |
| 4,532,377 | 7/1985 | Zink | 179/2 DP |
| 4,535,199 | 8/1985 | Zink | 179/2 DP |
| 4,542,380 | 9/1985 | Beckner et al. | 340/825.5 |
| 4,596,021 | 6/1986 | Carter et al. | 375/5 |

Primary Examiner—Ulysses Weldon
Attorney, Agent, or Firm—Wilbert Hawk, Jr.; Albert L. Sessler, Jr.

[57] ABSTRACT

A multiple mode switching device is disclosed which is capable of interconnecting either one of a first or second apparatus, such as a controller, to a third apparatus such as a modem or a business terminal, and which is capable of operating in a first mode in which either the first apparatus or the second apparatus can be manually selected for connection to the third apparatus; in a second mode in which either the first apparatus or the second apparatus can request connection to the third apparatus and will retain such connection as long as needed; and in a third mode in which a selected one of the first apparatus and the second apparatus has priority and will always obtain and retain connection to the third apparatus when needed. First and second manually controlled switches are provided for selecting the mode and the desired apparatus in the manual mode. Logic circuitry is provided for controlling the operation of the switching device in the second and third modes of operation.

10 Claims, 8 Drawing Sheets

MULTIPLE MODE SWITCHING MEANS

BACKGROUND OF THE INVENTION

Communications switching devices find use in applications in which the capability is desired for the selective coupling of one of two or more devices, such as a processor or controller, to a third device, such as a modem or a business terminal, for example. The modem or terminal can thus be shared between the devices, in accordance with changing requirements.

A need exists for such a switching device which enables the selection of one of the first or second devices to be made from that side of the switch and which resolves contention when more than one of the first and second devices desire to establish a connection with the third device at the same time.

SUMMARY OF THE INVENTION

The present invention relates to a multiple mode switching means and more particularly relates to a multiple mode switching means capable of operating in a manual mode, in an automatic mode, or in an automatic mode in which one of two devices adapted to be coupled to a third device takes priority over the other when both are in contention.

In accordance with one embodiment of the invention, a switching device capable of connecting a first or a second apparatus to a third apparatus and capable of operating in a first operating mode in which either the first or the second apparatus can be manually selected for connection to the third apparatus, in a second operating mode in which either the first apparatus or the second apparatus can request connection to the third apparatus and will retain such connection as long as needed, and in a third operating mode in which one of the first and second apparatuses is a priority apparatus and the other of said first and second apparatuses is a non-priority apparatus and said priority apparatus will always obtain and retain connection to the third apparatus when needed, comprises, in combination, a first port for coupling of the switching device to said first apparatus; a second port for coupling of the switching device to said second apparatus; a third port for coupling of the switching device to said third apparatus; first manually controlled switching means for selecting either the first operating mode, the second operating mode or the third operating mode; second manually controlled switching means operatively coupled to said first manually controlled switching means for selecting the first or second apparatus in the first operating mode; first logic means operatively coupled to said first manually controlled switching means for selecting either said first apparatus or said second apparatus for interconnection to said third apparatus in response to a request signal from either said first apparatus or said second apparatus when said switching device is operating in said second operating mode; and second logic means operatively coupled to said first manually controlled switching means for selecting whichever of said first or second apparatus has priority in response to a request signal therefrom when said switching means is operating in said third operating mode.

It is accordingly an object of the present invention to provide a multiple mode switching means.

Another object is to provide a switching means having a manual operating mode, an automatic operating mode and an automatic mode in which one of two devices adapted to be coupled to a third device takes priority over the other when both are in contention.

Another object is to provide a multiple mode switching means having manual switching means for mode selection and logic circuitry for interconnect apparatus selection.

With these and other objects, which will become apparent from the following description, in view, the invention includes certain novel features of construction and combinations of parts, one form or embodiment of which is described with reference to the drawings which accompany and form a part of this specification.

DETAILED DESCRIPTION OF THE INVENTION

Figure 1:
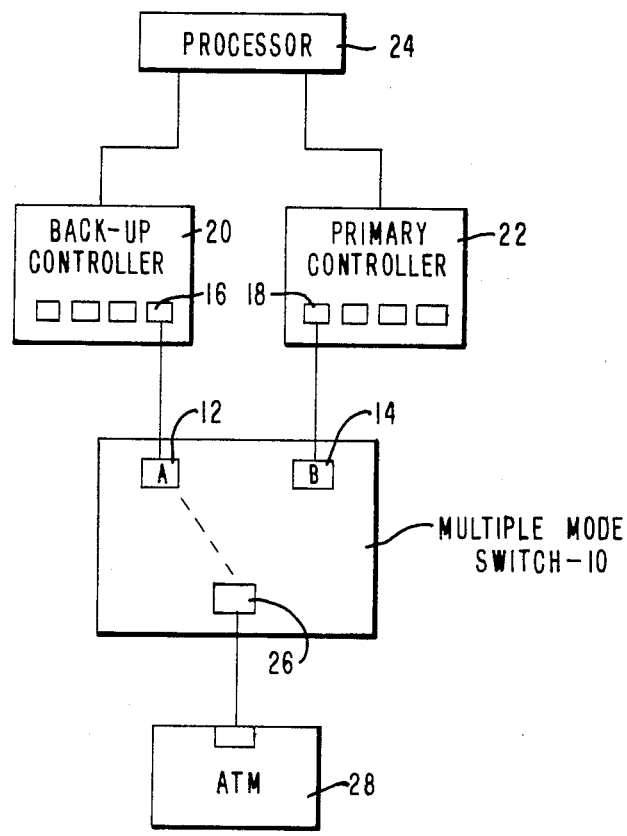
FIG. 1 is a block diagram showing the multiple mode switch of the present invention in a system in which it is used to couple an automated teller machine selectively to a primary or a back-up processor controller.

Referring now to FIG. 1 of the drawings, there is shown an illustrative system in which the multiple mode switching device of the present invention may be employed. It will be recognized that the multiple mode switching device may be used in many different types of systems and environments and that the system of FIG. 1 is only one example. Another example would be the use of the switch to connect, alternatively, two different utilizing devices to a communications modem.

As shown in FIG. 1, the multiple mode switch 10 is provided with first and second ports 12 and 14, also designated port A and port B, respectively, for connection on one side to ports 16 and 18 of devices such as a back-up controller 20 and a primary controller 22, both controlled by a processor 24. A third port 26 on the other side of the switching device 10 is shown in FIG. 1 as being coupled to an automated teller machine (ATM) 28. In normal operation of the system, the processor 24 will act through the primary controller 22 and the switch 10 to control and communicate with the ATM 28. Two-way communication through the switch 10 is established and maintained between the primary controller 22 and the ATM 28.

If for some reason the primary controller 22 ceases to function properly, or is removed from the system for some other reason, the back-up controller 20 may take its place. This is accomplished by switching of the switching device 10 to interconnect the back-up controller 20 to the ATM 28, in place of the primary controller 22. Such switching may be accomplished in any one of three modes: a manual mode; an automatic mode, or an automatic mode in which the back-up controller 20 has priority.

Figure 2:
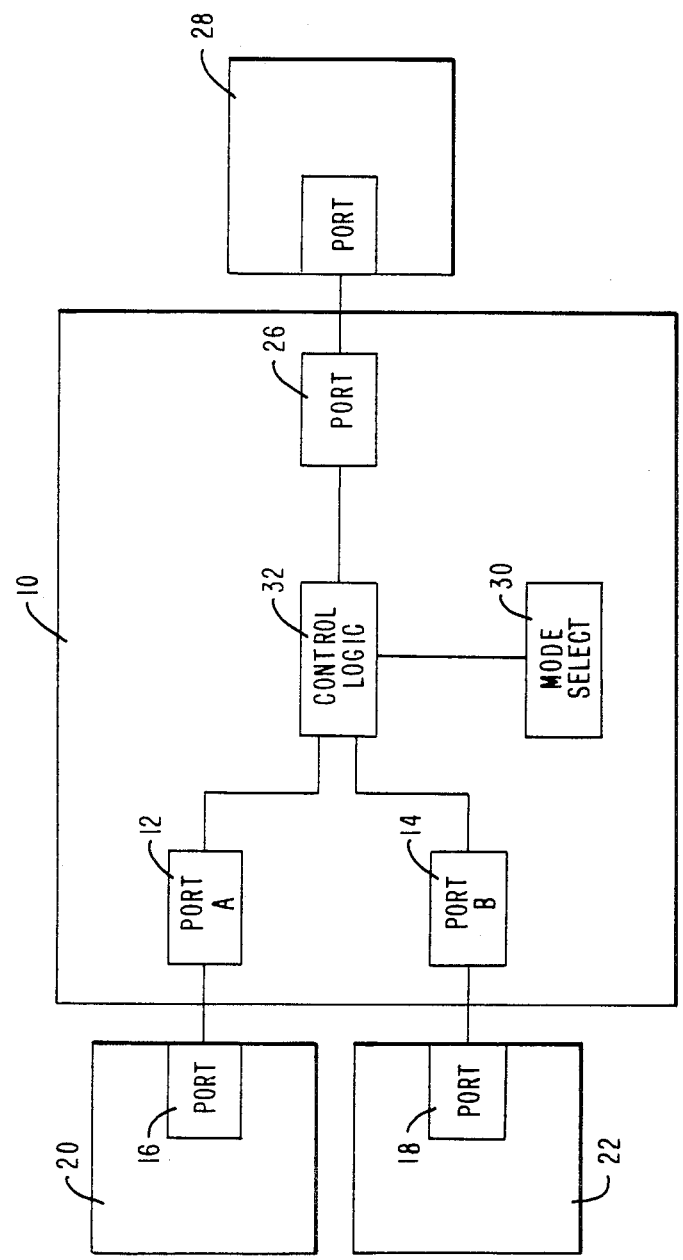
FIG. 2 is a block diagram of the multiple mode switch.

In FIG. 2, a more detailed block diagram of the switching device 10 is shown, together with representations of the devices 20, 22 and 28, to which it is coupled. Included in the switching device 10 are a mode select block 30 and a control logic block 32. In the manual mode, a manually-operated switch in the mode select block 30 is set to select either port 12 or port 14 for operative coupling to port 26, and that coupling continues for so long as the manually-operated switch remains in the position to which it has been set. In the automatic mode, whichever controller 20 or 22 first requests connection to the ATM 28 is so connected by means of the control logic 32, and remains so connected until its communication is completed and a connection has been requested by the other controller 22 or 20. In the automatic mode in which one controller has priority, if the controller having priority requests connection, it will be connected and will remain connected until its communication has been completed and the other controller has requested connection. If the non-priority controller requests connection, and the priority controller is not connected, connection of the non-priority controller to the ATM 28 will be granted. However, if at any time, the priority controller requests connection, this will be immediately granted by the control logic 32, even though communication between the non-priority controller and the ATM 28 is interrupted as a consequence.

The circuitry employed in the switching device 10 is shown in detail in FIGS. 3-8 inclusive. It will be noted in these figures that most of the various circuit terminations have a number associated therewith. These numbers refer to the drawing figure numbers in which the circuit is continued. The figures of the drawing also contain component values and chip designations to aid in an understanding of the invention. All of the semiconductor devices shown in the circuitry and described in the specification are generally available from a number of manufacturers. One such manufacturer is Texas Instruments, Inc. of Dallas, Tex.

Figure 3:
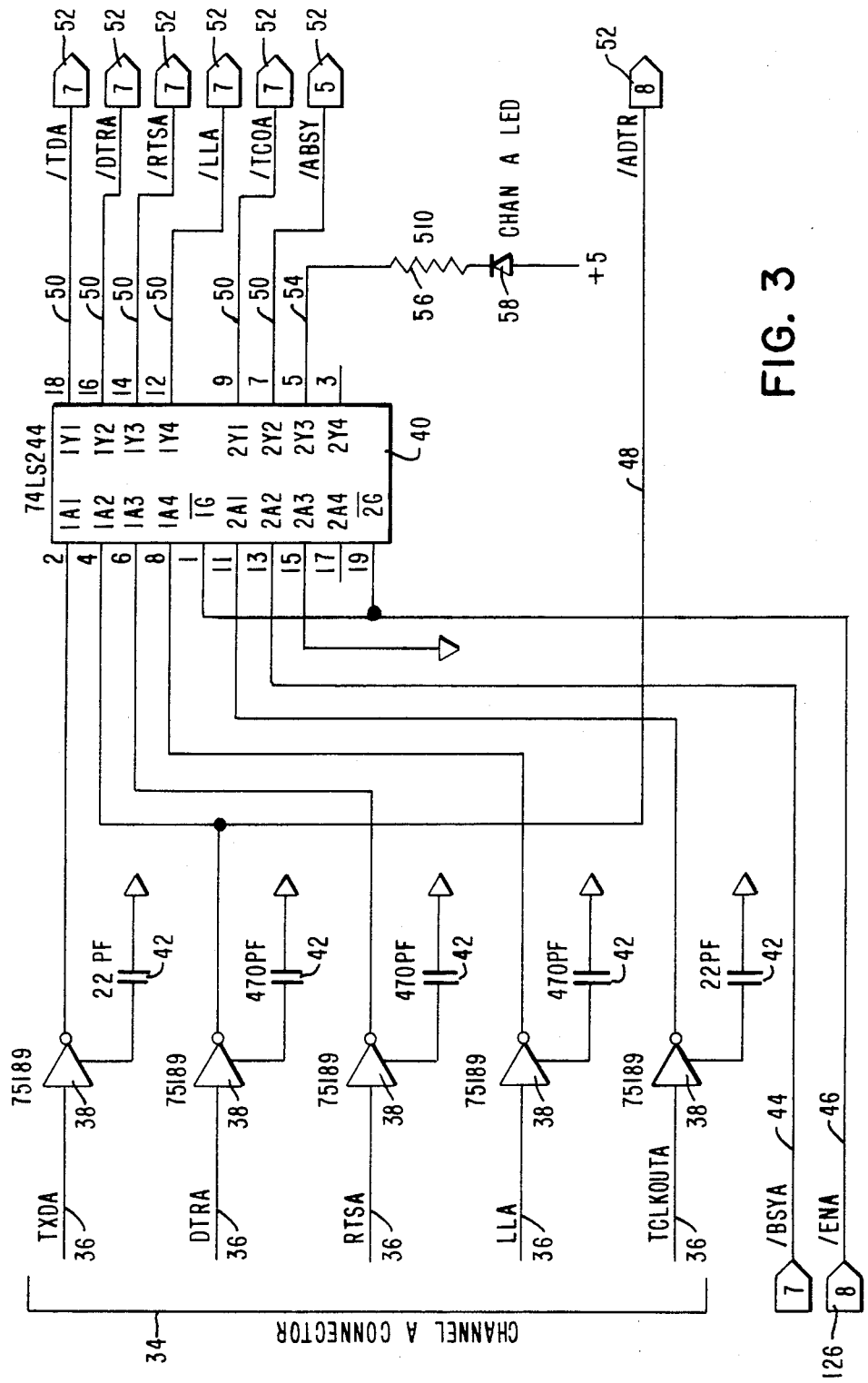
FIG. 3 is a logic diagram of a first port of the multiple mode switch and associated circuitry for communication in one direction.

Referring now to FIG. 3, this figure shows the logic circuitry associated with channel A which provides unidirectional communication from port 12 (port A) to port 26. From a channel A connector 34, it will be seen that a plurality of conductors 36, extend to a plurality of standard RS232 interface receivers 38 and then to an octal buffer and line driver 40, which may be of type 74LS244. The receivers 38 may be of type 75189, and each is also connected to a base reference potential, shown as ground, through a capacitor 42, of varying capacitance, depending upon the conductor, as shown in FIG. 3. The various conductors 36 carry signals designated and defined as follows: TXDA, transmit data for channel A; DTRA, data terminal ready, channel A; RTSA, request to send, channel A; LLA, ring indicator; and TCLKOUTA, transmit clock out. The signal DTRA, after being modulated by a receiver 38, continues on a conductor 48 to a termination 52 as signal /ADTR. In addition, the following signals on conductors 44 and 46 come from other parts of the logic circuitry, as indicated by the previously-described termination code and are applied to the octal buffer and line driver 40: /BSYA, busy channel A; and /ENA, enable channel A. The signal /ENA originates in the logic circuitry of FIG. 8, as will be subsequently described, and is connected to pins 1 and 19 of the octal buffer and line driver 40 to control its transmission or interruption of the various signals.

Output signals from the octal buffer and line driver 40 appear on conductors 50 and are shown in FIG. 3 as extending to terminations 52, from where they are applied to other portions of the logic circuitry. These output signals include /TDA, /DTRA, RTSA, /LLA, /TCOA and /ABSY, having functions as defined for the corresponding input signals. Also appearing on the output side of the octal buffer and line driver 40 is a conductor 54 connected through a resistor 56 and an LED indicator 58 to a source of plus five volts potential. In use, the LED indicator 58 provides indication of whether the octal buffer and line driver 40 is transmitting or interrupting the various signals applied to it.

Figure 4:
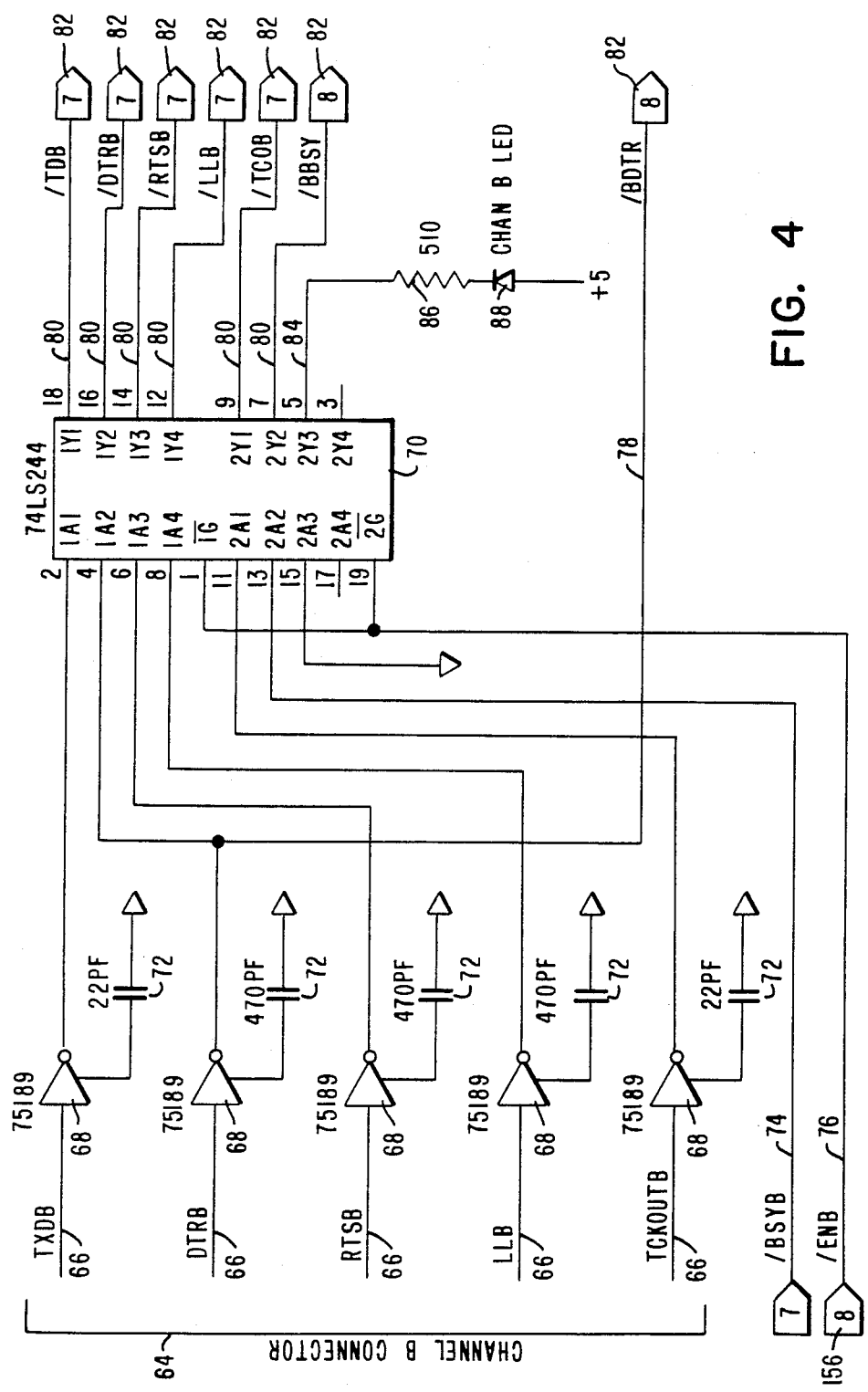
FIG. 4 is a logic diagram of a second port of the multiple mode switch and associated circuitry for communication in one direction.

Referring now to FIG. 4, this circuitry is essentially a duplicate of the circuitry of FIG. 3, except that it relates to unidirectional communication from port 14 (port B), rather than port 12 .(port A) to port 26. From a connector 64, conductors 66 extend to receivers 68 and then to an octal buffer and line driver 70. Signals /BSYB and /ENB are applied by conductors 74 and 76 to the octal buffer and line driver 70. Output conductors 80 extend to terminations 82. An LED indicator 88 provides indication as to the status of the octal buffer and line driver 70. Other portions of the circuitry not specifically described have the same functions as their corresponding elements in FIG. 3.

Figure 7:
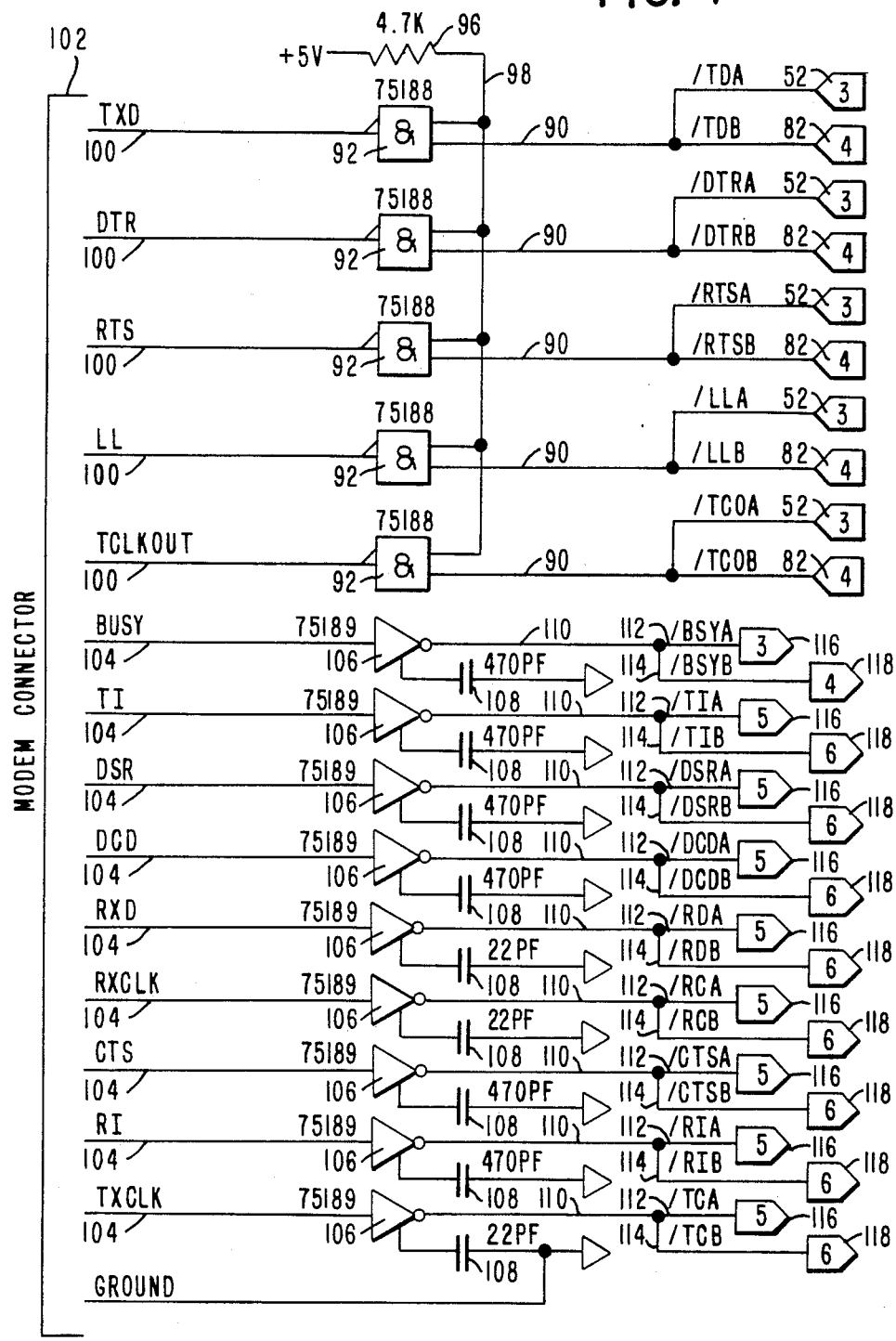
FIG. 7 is a logic diagram of the third port and associated circuitry for communication in both directions.

Shown in FIG. 7 is a portion of the logic circuitry associated with channel A, which provides unidirectional communication from port 26 to port 12 (port A), and a portion of the logic circuitry associated with channel B, which provides unidirectional communication from port 26 to port 14 (port B). In the upper portion of FIG. 7, the terminations 52 and 82 associated with corresponding signals from FIGS. 3 and 4 respectively, are connected in parallel to provide a signal from one or the other of ports A or B to conductors 90 to provide one input to each of a series of transmitters 92, which may be two-input NAND gates of type 75188. A second input for each transmitter 92 is, provided from a conductor 98, which is connected through a resistor 96 to a plus five volt source of potential. The output of each transmitter 92 is connected to a conductor 100 which in turn is connected to a connector 102. The various signals appearing on the conductors 100 are shown in FIG. 7 and correspond to the signals applied from either port A or port B over the terminations 52 or 82.

In the lower portion of FIG. 7 is shown a portion of the logic circuitry for transmitting data from the port 26 to a selected one of the ports 12 or 14. A plurality of conductors 104 are connected to the connector 102 and each extends to an input of a receiver 106, which may be of type 75189. Each of said receivers is also connected to a base reference potential, shown here as ground, through a capacitor 108, the capacitance of which is shown in FIG. 7 and varies in according to particular line requirements. The output of each receiver 106 is applied to a conductor 110, which branches into two conductors 112 and 114, connected in the drawing to terminations 116 and 118, which are also found in FIGS. 5 and 6, respectively.

Figure 5:
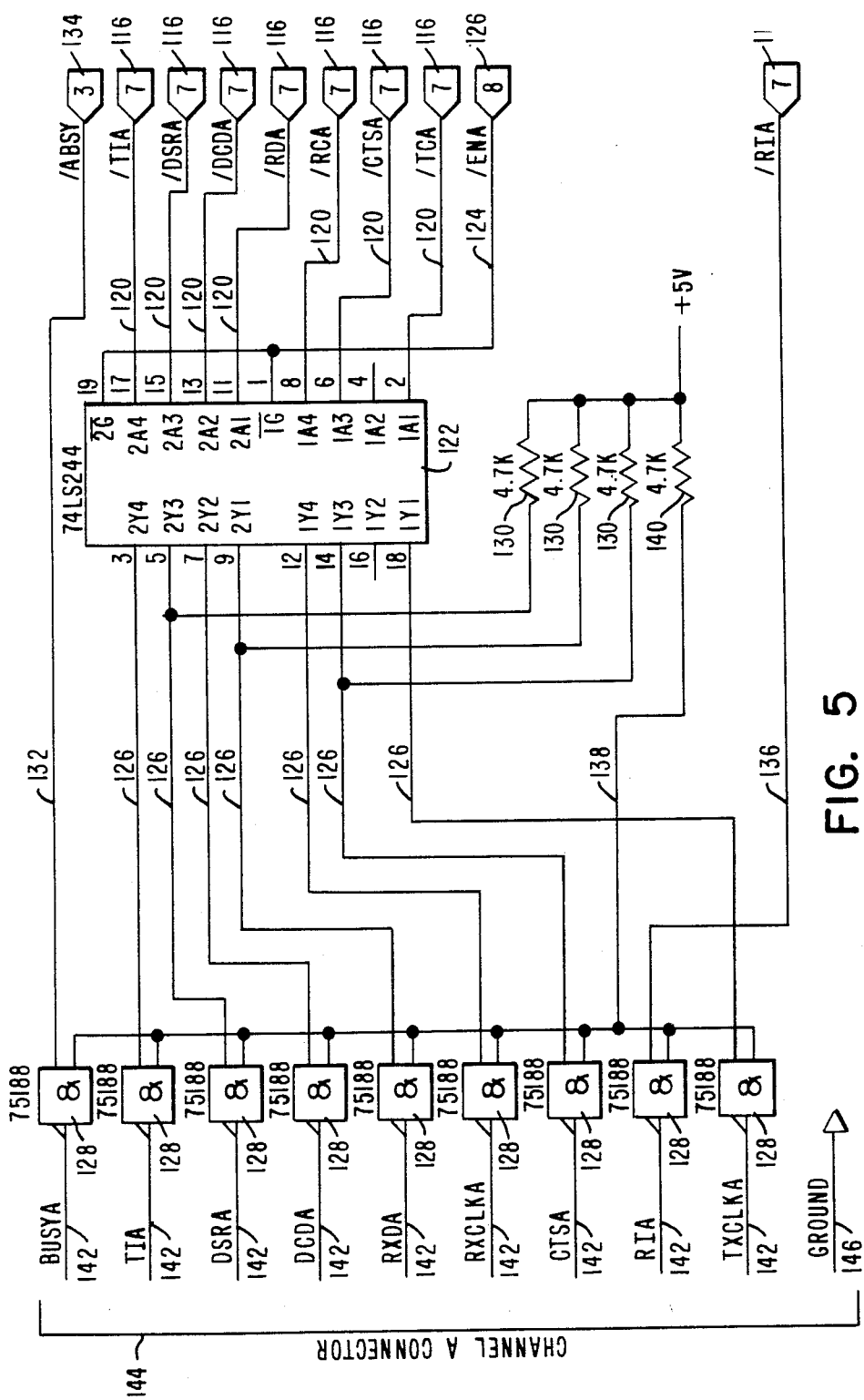
FIG. 5 is a logic diagram of the first port and associated circuitry for communication in a second direction.

FIG. 5 shows the remaining portion of the logic circuitry for transmitting data from the port 26 to port 12

(port A). A plurality of conductors 120 extend from terminations 116 to pin locations on an octal buffer and line driver 122, which may be of type 74LS244. In addition, a conductor 124 carrying an enable signal /ENA, extends from a termination 126 (FIG. 8) to pins 1 and 19 of the octal buffer and line driver 122 to control the operation of said device.

Conductors 126 are connected to output pins of the octal buffer and line driver 122 and carry signals corresponding to the signals input to the octal buffer and line driver 122 on corresponding conductors 120. Each of the conductors 126 is connected to an input of a transmitter 128, which may be of type 75188. Conductors 126, connected to pins 5, 9 and 14 of the octal buffer and line driver 122, are also connected over 4.7K ohm resistors 130 to a source of plus five volts potential. In addition, a conductor 132 from a termination 134 associated with FIG. 3 and a conductor 136 from a termination 116 are also connected to inputs of transmitters 128. A second input of each transmitter 128 is connected by a conductor 138 through a 4.7K ohm resistor 140 to a plus five volt source of potential. Outputs of the transmitters 128 are connected by conductors 142 to a channel A connector 144, which, when connected, provides the device coupled to the connector 144 with data from the port 26 when the switching device 10 connects the ports 12 and 26. The connector 144 is grounded over a conductor 146.

Figure 6:
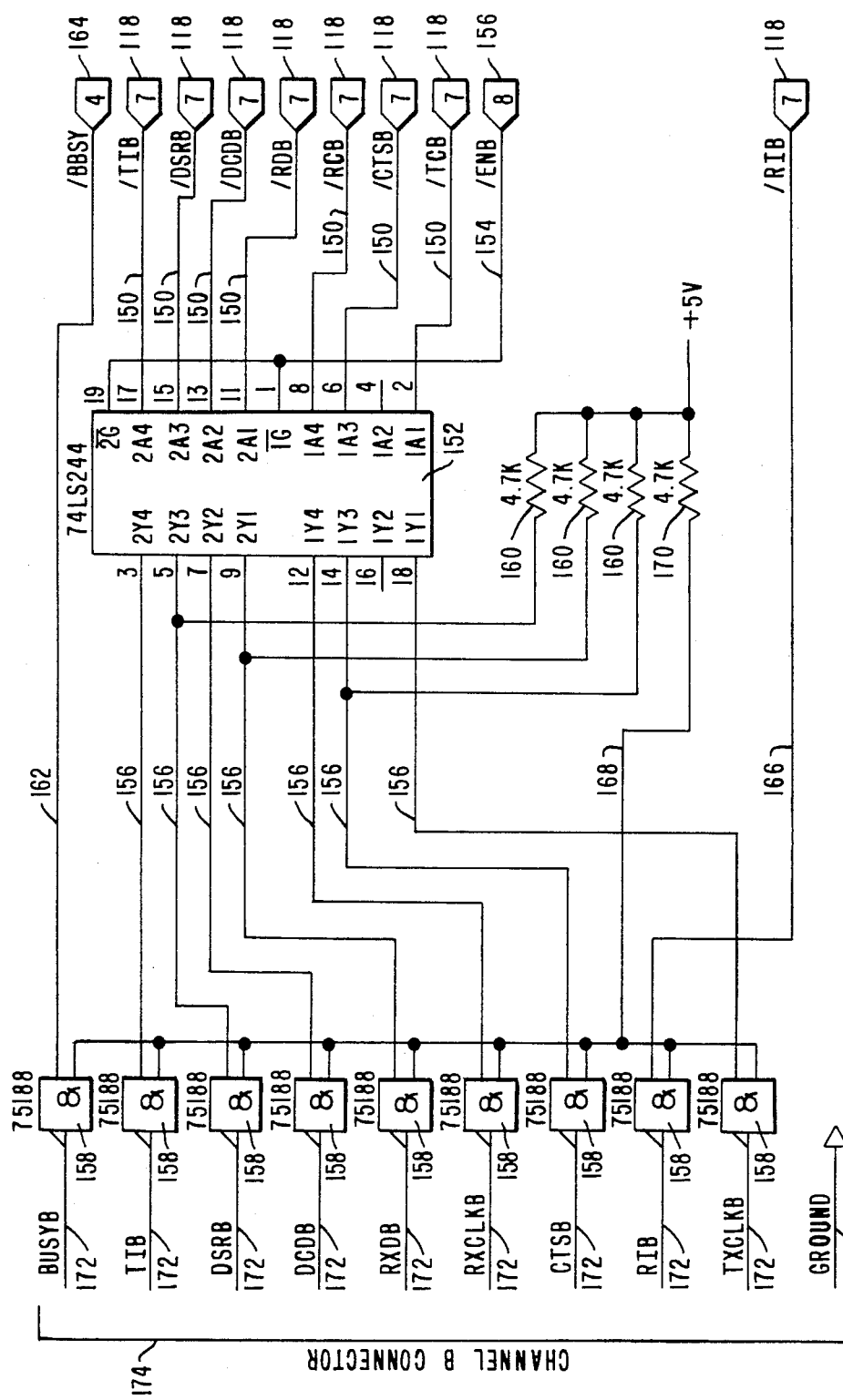
FIG. 6 is a logic diagram of the second port and associated circuitry for communication in a second direction.

Referring now to FIG. 6, this circuitry is essentially a duplicate of the circuitry of FIG. 5, except that it relates to unidirectional communication from the port 26 to port 14 (port B), rather than port 12 (port A). A plurality of conductors 150 extend from terminations 118 to pin locations on an octal buffer and line driver 152, which may be of type 74LS244. In addition, a conductor 154, carrying an enable signal /ENB, extends from a termination 156 to pins 1 and 19 of the octal buffer and line driver 152 to control the operation of said device. Output conductors 156, from the octal buffer and line driver 152, extend to inputs of transmitters 158, which may be of type 75188. Second inputs of the transmitters 158 are connected via a conductor 168 and a resistor 170 to a plus five volt source of potential. Conductors 156 connected to pins 5, 9 and 14 of the octal buffer and line driver 152 are also connected over 4.7K ohm resistors 160 to a source of plus five volts potential. In addition, a conductor 162 from a termination 164 associated with FIG. 4, and a conductor 166 from a termination 118 associated with FIG. 7 are also connected to inputs of transmitters 158. Outputs of the transmitters 158 are connected by conductors 172 to a channel B connector 174 which, when connected, provides the device coupled to the connector 144 with data from the modem port 26 when the switching device 10 connects the ports 14 and 26. The connector 174 is grounded over a conductor 176.

Figure 8:
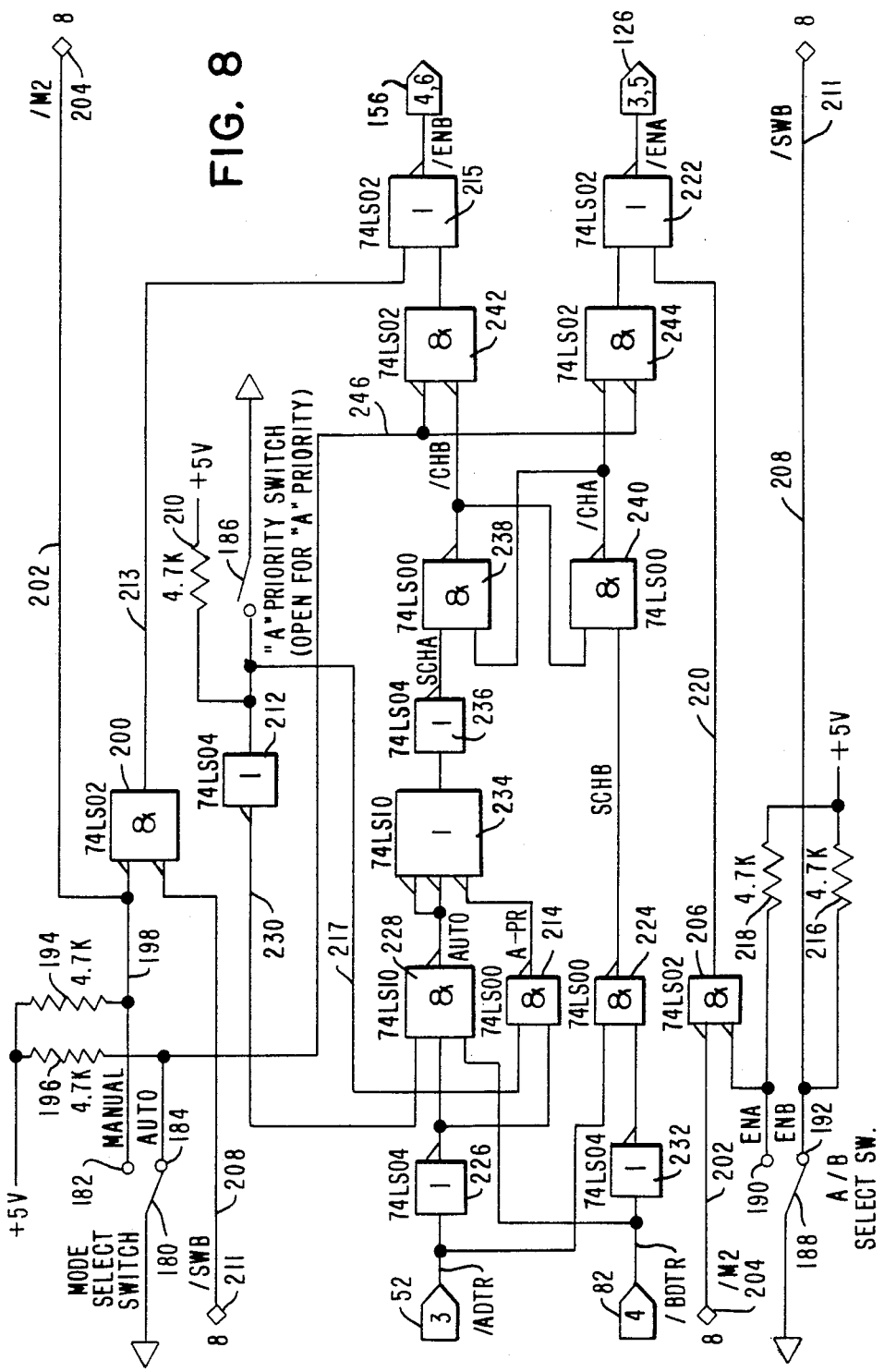
FIG. 8 is a logic diagram of the switch and control logic for mode selection and selection of which of the first two ports is to be coupled to the third port.

FIG. 8 shows in detail the mode select circuitry 30 and the control logic circuitry 32. A mode select switch 180 is connected at one side to a base reference potential, shown as ground, and can be set either to a "manual" position 182 or to an "auto" position 184. A switch 186 is connected at one side to a base reference potential, shown as ground, and is operable, when open, to place the switching means 10 in an "A priority" mode, as previously explained. At its other side, the switch 186 is connected by a first branch over a 4.7K ohm resistor 210 to a plus five volt source of potential; by a second branch to the input of an inverter 212, which may be of type 74LS04; and by a third branch 217 to one input of a two-input NAND gate 214, which may be of type 74LS00. This switch 186 is effective only when switch 180 is in the "auto" position. When the switch 186 is closed, a non-priority "auto" mode is established. It will thus be seen that switches 180 and 186 can be set to cause the switching device 10 to operate in any of the three previously-defined modes of operation.

When the "manual" mode is selected, it is also necessary to select either port 12 (port A) or port 14 (port B). This is accomplished by operation of switch 188, which is grounded at one side and can be set either in position 190 (enable A) or in position 192 (enable B).

Returning to switch 180, it will be seen that both positions 182 and 184 are connected through 4.7K ohm resistors 194 and 196 to a source of plus five volts potential. In addition, the manual position 182 is connected by a conductor 198 to one input of a two-input NOR gate 200, which may be of type 74LS02, and is also connected by a conductor 202, carrying a signal /M2, to one input of a NOR gate 206, which may be of type 74LS02. The conductor 202 is shown in FIG. 8 in interrupted form, the interconnection between the two portions being represented by the small block 204. The second input to the gate 200 is the signal /SWB, appearing on conductor 208. This conductor is also shown in FIG. 8 in interrupted form, with the interconnection between the two portions being represented by the small block 211. It will be seen that the conductor 208 originates at the "enable B" position 192 of the A/B select switch 188. The output of the gate 200 is connected via a conductor 213 to one input of a two input NOR gate 215, which may be of type 74LS02.

The "enable B" position 192 of the switch 188, in addition to being connected to the conductor 208, is also connected via a 4.7K ohm resistor 216 to a plus five volt source of potential. Similarly, the "enable A" position 190 of the switch 188 is connected to the plus five volt source of potential via a 4.7K ohm resistor 218, and is also connected to a second input of the two-input NOR gate 206. The output of the gate 206 is connected over a conductor 220 to one input of a two-input NOR gate 222, which may be of type 74LS02.

The data terminal ready signals /ADTR and BDTR from devices coupled to ports 12 and 14, respectively, enter the switching device 10 via connectors 34 (FIG. 3) and 64 (FIG. 4), respectively, and are interconnected, as shown in the drawings, to FIG. 8 via terminations 52 and 82.

The signal /ADTR is applied to one input of a two-input NAND gate 224, which may be of type 74LS00, and is also applied to an inverter 226, which may be of type 74LS04. The output of the inverter 226 is applied to a second input of the previous mentioned gate 214 and is also applied to one input of a three-input NAND gate 228, which may be of type 74LS10. A second input of the gate 228 is provided via a conductor 230 from the previously-described inverter 212.

The signal /BDTR is applied to the third input of the gate 228 and is also inverted by an inverter 232, which may be of type 74LS04, and is applied to the second input of the gate 224. The outputs of the gates 228 and 214 are applied to a three-input NAND gate 234, which may be of type 74LS10. The output of that gate, in turn, is inverted by an inverter 236, which may be of type 74LS04, and is applied in the form of a signal SCHA (select channel A) to one input of a two-input NAND gate 238.

The output of the gate 224, in the form of a signal SCHB (select channel B), is applied to one input of a two-input NAND gate 240. The outputs of the gates 238 and 240, which together form a latch, are cross-coupled to each other and provide a second input for the other gate. In addition, the output of the gate 238 is applied as one input of a two-input NOR gate 242, and the output of the gate 240 is applied as one input of a two-input NOR gate 244. The second input of each of these gates is connected via a conductor 246 to the position 184 of the mode select switch 180. The output of the gate 242 is connected to a second input of the gate 215, and the output of the gate 244 is connected to a second input of the gate 222. The output of the gate 215 carries the enable B signal /ENB, which is shown in the drawings as being interconnected via termination 156 to FIGS. 4 and 6. The output of the gate 222 carries the enable A signal /ENA, which is shown in the drawings as being interconnected via termination 126 to FIGS. 3 and 5.

The manner in which the logic circuitry of the present invention operates will now be described. Let it first be assumed that it is desired to operate the system in the "manual" mode, with port 12 (port A) selected. In such case, the switch 180 is set to position 182 and the switch 188 is set to position 190. Since the switch 180 is set to manual position, the conductor 202 and the block 204 are grounded, which means that one input of the gate 206 is grounded. Since position 190 of switch 188 is grounded, the other input of the gate 206 is also grounded. This results in a logic one output from the gate 206, which is applied on the conductor 220 to one input of the NOR gate 222, resulting in a logic zero output therefrom, which means that the enable A signal/ENA is active. This signal is applied to the octal buffer and line driver 40 (FIG. 3) and to the octal buffer and line driver 122 (FIG. 5) to establish two-way communication between ports 12 and 26 of the switching device 10.

In a similar manner, if channel B (port 14) is selected in the manual mode, switch 188 is set to position 192, as shown in FIG. 8. The conductor 208 (with interconnection 211) is accordingly grounded, so that both inputs to the gate 200 are grounded, producing a logic one output from the gate 200. This output is carried on the conductor 213 to one input of the NOR gate 215, resulting in a logic zero output therefrom, which means that the enable B signal /ENB is active. This signal is applied to the octal buffer and line driver 70 (FIG. 4) and to the octal buffer and line driver 152 (FIG. 6) to establish two-way communication between ports 14 and 26 of the switching device 10.

Next, let it be assumed that it is desired to operate the system in the "auto" mode, but without priority. In such case, the switch 180 is set to position 184 and switch 186 is closed. Let it further be assumed that the port 14 (channel B) device requests connection to the modem port 26. This is done by activating the signal DTRB (FIG. 4), which is applied as active low signal /BDTR to the gate 228 and through inverter 232 to the gate 224 of the circuitry of FIG. 8 through termination 82. At this time, signal /ADTR is assumed not to be active and therefore will be at a "high" logic level.

Given this combination of signals, the "auto" output of gate 228 is high and, the A-PR output of gate 214 is high. Accordingly, the output of gate 234 is low, which results in the SCHA (select channel A) output of the inverter 236 being high. Conversely, the SCHB (select channel B) output of the gate 224 is low. This combination of signals applied to the latch comprising the gates 238, 240 produces a low output from gate 238 and a high output from gate 240. These outputs are applied as inputs to gates 242 and 244, respectively, together with "low" inputs on these gates from the conductor 246. Gate 242 thus has a "high" logic output, while gate 244 has a "low" logic output. These outputs are applied, respectively, to gates 215 and 222, together with inputs on the conductors 213 and 220, respectively. Since one input to gate 215 is "high", the enable B output /ENB is active low, and is applied through termination 156 to the circuitry of FIGS. 4 and 6 to operate the octal buffer and line driver devices 70 and 152 to provide communication on channel B through the switching device 10. The data set ready (DSR) signal from port 26 is now sent to port 14, which will begin its operations when it detects the signal DSR. Since both inputs to the gate 222 are low, the output of this gate, which is the enable channel A signal /ENA, is high, so that this signal is not active and its associated octal buffer and line driver devices 40 and 122 in FIGS. 3 and 5 are not operated.

Communication in the auto mode on channel B, through the switching device 10, will continue so long as signal DTRB remains active. When that signal becomes inactive and the channel data ready signal DTRA becomes active, the enable A signal /ENA will become active low and the octal buffer and line driver devices 40 and 122 in FIGS. 3 and 5 will be operated to establish two-way communication on channel A. The manner in which the various gates of FIG. 8 function to accomplish this is believed to be clear to one skilled in the art in view of the above description of the operation of channel B and therefore will not be described in detail.

Let it now be assumed that it is desired to operate the system in the "auto with A priority" mode. In such case, the switch 180 is set to position 184 and the switch 186 is open. Let it further be assumed that the port 14 (channel B) device initially requests connection to the modem port 26. As previously stated, this is done by activating the signal DTRB (FIG. 4), which is applied as active low signal /BDTR to the gate 228 and through inverter 232 to the gate 224 of the circuitry of FIG. 8. At this time, signal/ADTR is assumed not to be active, and therefore will be at a "high" logic level.

Given this combination of signals, the "auto" output of gate 228 is high, as is the A-PR output of gate 214. Accordingly, the output of gate 234 is low, which results in the SCHA (select channel A) output of the inverter 236 being high, while the SCHB (select channel B) output of the gate 224 is low. As described above in the description of operation of the system in the "auto" mode, the enable B output signal ENB is therefore active low, while the enable A output signal /ENA is inactive high.

Now let it be assumed that while operating in this auto A priority mode, with communications proceeding through channel B, that the device connected to port 12 (port A) requests connection by activating the data ready signal DTRA (FIG. 3), which is applied as active low signal /ADTR through the termination 52 (FIG. 8) to inverter 226 and gate 224. The change in logic level from high to low of signal ADTR applied to an input of the gate 224 causes signal SCHB on the output of said gate to shift from an active low state to an inactive high state. This, in turn, causes the enable B signal /ENB, on the output of the NOR gate 215, to assume an inactive high status. This disables the octal buffer and line driver devices 70 and 152, thus disconnecting the port B device.

The inverted output signal of the inverter 226 changes from low logic level to high logic level and is applied to one input of the two-input AND gate 214. Since the second input on conductor 217 is also at a high logic level, the signal A-PR on the output of the gate 214 changes to a low logic level. This shifts the output of the gate 234 to a high logic level, which is inverted by the inverter 236 to cause the select channel A signal SCHA to assume an active low condition. This, in turn, causes the enable A signal /ENA, on the output of the NOR gate 222, to assume an active low condition. This enables the octal buffer and line driver devices 40 and 122, thereby connecting the port 12 (port A) device to the port 26 (modem port) device. The port 12 (port A) device retains control of the switching device 12 until the signal DTRA is terminated, at which time the port 14 (port B) device can again utilize the switching device until the port A device again desires to establish a connection with port 26.

While the form of the invention illustrated and described herein is admirably adapted to fulfill the objects aforesaid, it is to be understood that other and further modifications within the scope of the following claims may be made without departing from the spirit of the invention.

What is claimed is:

1. A switching device capable of connecting a first or a second apparatus to a third apparatus and capable of operating in a first operating mode in which either the first apparatus or the second apparatus can be manually selected for connection to the third apparatus, in a second operating mode in which either the first apparatus or the second apparatus can request connection to the third apparatus and will retain such connection as long as needed, and in a third operating mode in which one of the first and second apparatuses is a priority apparatus and the other of the first and second apparatuses is a non-priority apparatus and said priority apparatus will always obtain and retain connection to the third apparatus when need, comprising, in combination:
   a first port for coupling of the switching device to said first apparatus;
   a second port for coupling of the switching device to said second apparatus;
   a third port for coupling of the switching device to said third apparatus;
   first manually controlled switching means for selecting either the first operating mode, the second operating mode or the third operating mode;
   second manually controlled switching means operatively coupled to said first manually controlled switching means for selecting the first or second apparatus in the first operating mode;
   first logic means operatively coupled to said first manually controlled switching means for selecting either said first apparatus or said second apparatus for interconnection to said third apparatus in response to a request signal from either said first apparatus or said second apparatus when said switching device is operating in said second operating mode; and
   second logic means operatively coupled to said first manually controlled switching means for selecting whichever of said first or second apparatus has priority in response to a request signal therefrom when said switching means is operating in said third operating mode.

2. The switching device of claim 1 in which means are provided for two-way communication between said third apparatus and either said first apparatus or said second apparatus when operatively coupled to said switching device.

3. The switching device of claim 1 in which two driver means are provided for each of said first apparatus and second apparatus, said driver means being controlled by said first and second logic means to control communication in both directions between said first apparatus or said second apparatus and said third apparatus.

4. The switching device of claim 3 in which said second logic means disables the driver means of the non-priority first or second apparatus and enables the driver means of the priority first or second apparatus whenever said switching device is operating in said third mode and a request signal is received from said priority first or second apparatus.

5. The switching device of claim 1 in which said first manually controlled switching means includes a first switch for selecting the first mode in a first position and also positionable in a second position, said first manually controlled switching means also including a second switch for selecting either the second mode or the third mode when said first switch is in said second position.

6. The switching device of claim 1 in which the first and second apparatuses are automated teller machine controllers and the third apparatus is an automated teller machine.

7. The switching device of claim 1 in which the first apparatus is a primary automated teller machine controller, the second apparatus is a back-up automated teller machine controller, and the third apparatus is an automated teller machine.

8. The switching device of claim 7, also including a processor coupled to said primary and back-up automated teller machine controllers, in which the switching device operates in said third mode and in which the back-up automated teller machine controller is the priority apparatus, so that the primary automated teller machine controller is coupled to the automated teller machine through the switching device when the back-up automated teller machine controller is not functioning and when the primary automated teller machine controller has been selected by the processor for controlling the automated teller machine.

9. The switching device of claim 1 in which said second logic means includes a NAND gate in an enabling circuit for the non-priority apparatus which causes said enabling circuit to be disabled when a request signal is received from the priority apparatus and applied to said NAND gate.

10. The switching device of claim 9 in which said second logic means also includes an inverter in series with the output of said NAND gate.

* * * * *

UNITED STATES PATENT AND TRADEMARK OFFICE
CERTIFICATE OF CORRECTION

PATENT NO. : 4,812,840

DATED : March 14, 1989

INVENTOR(S) : Donald J. Girard

It is certified that error appears in the above-identified patent and that said Letters Patent is hereby corrected as shown below:

Column 9, line 45, delete "need" and substitute
--needed--.

Signed and Sealed this

Ninth Day of May, 1989

Attest:

DONALD J. QUIGG

*Attesting Officer*  *Commissioner of Patents and Trademarks*